(12) United States Patent
Shiroishi

(10) Patent No.: US 6,404,605 B2
(45) Date of Patent: *Jun. 11, 2002

(54) MAGNETIC RECORDING AND READING DEVICE

(75) Inventor: Yoshihiro Shiroishi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/725,253

(22) Filed: Nov. 29, 2000

Related U.S. Application Data

(63) Continuation of application No. 09/377,189, filed on Aug. 19, 1999, now Pat. No. 6,266,210.

(30) Foreign Application Priority Data

Aug. 20, 1998 (JP) .............................................. 10-233827

(51) Int. Cl.⁷ ........................... G11B 5/147; G11B 5/82; G11B 5/39
(52) U.S. Cl. ....................... 360/324; 360/135; 360/126
(58) Field of Search .......................... 360/324, 317, 360/326, 234.4, 234.5, 235, 264.2, 266.3, 135, 271.9; 324/252

(56) References Cited

U.S. PATENT DOCUMENTS

| | | | |
|---|---|---|---|
| 4,651,248 A | * 3/1987 | Shiiki et al. ................. 360/119 |
| 4,809,232 A | * 2/1989 | Baumbaugh et al. ........ 365/221 |
| 4,949,039 A | * 8/1990 | Grunberg ..................... 324/252 |
| 5,206,590 A | * 4/1993 | Dieney et al. .............. 324/252 |
| 5,363,251 A | * 11/1994 | Kamo et al. .................... 360/55 |
| 5,446,307 A | * 8/1995 | Lux et al. .................... 257/423 |
| 5,493,467 A | * 2/1996 | Cain et al. ................... 360/321 |
| 5,563,752 A | * 10/1996 | Komuro et al. ........... 360/324.1 |
| 5,572,490 A | * 11/1996 | Kazama ......................... 369/13 |
| 5,621,596 A | * 4/1997 | Santini ........................ 360/126 |
| 5,712,747 A | * 1/1998 | Voldman et al. .......... 360/234.4 |
| 5,739,988 A | * 4/1998 | Gill ........................ 360/324.12 |
| 5,932,343 A | * 8/1999 | Hayashi et al. .............. 428/332 |
| 5,949,623 A | * 9/1999 | Lin ........................ 360/324.12 |
| 5,956,208 A | * 9/1999 | Kawazoe .................. 360/234.3 |
| 5,969,523 A | * 10/1999 | Chung et al. ................ 324/252 |
| 5,970,602 A | * 10/1999 | Harada et al. ............ 29/603.06 |
| 6,014,289 A | * 1/2000 | Goss ........................ 360/244.1 |
| 6,194,896 B1 | * 2/2000 | Takahashi et al. ........... 324/252 |
| 6,034,851 A | * 3/2000 | Zarouri et al. ............... 360/137 |
| 6,038,102 A | * 3/2000 | Balakrishnan et al. ... 360/264.2 |
| 6,046,882 A | * 4/2000 | Pattanaik et al. .............. 29/878 |
| 6,055,131 A | * 4/2000 | Takahashi et al. ........ 360/244.5 |
| 6,069,774 A | * 5/2000 | Arisaka et al. ........... 360/245.3 |
| 6,114,850 A | * 9/2000 | Hayashi ....................... 324/252 |
| 6,122,818 A | * 9/2000 | Lee ........................... 29/603.12 |
| 6,125,019 A | * 9/2000 | Hoshiya et al. ........... 360/324.1 |

(List continued on next page.)

Primary Examiner—William Klimowicz
(74) Attorney, Agent, or Firm—Antonelli, Terry, Stout & Kraus, LLP

(57) ABSTRACT

A magnetic recording and reading device which has a transfer rate of not less than 50 MB/s and which includes a magnetic recording medium having an absolute value of normalized noise coefficient per recording density of not more than $2.5 \times 10^{-5}$ ($\mu$Vrms)(inch)($\mu$m)$^{0.5}$/($\mu$Vpp), and a magnetic head which is mounted on an integrated circuit suspension so that a total inductance is reduced to be not more than 65 nH. The magnetic head has a magnetic core which is not more than 35 $\mu$m of length, a part of the magnetic core being formed by a magnetic film having a resistivity exceeding at least 50 $\mu\Omega$cm or by a multilayer film consisting of a magnetic film and an insulating film. A fast R/W-IC having a line width of not more than 0.35 $\mu$m is also provided. The magnetic head is provided with a reading element including one of a giant magnetoresistance effect element and a thin film having tunneling-magnetoresistance effect, with an effective track width of not more than 0.9 $\mu$m, and performs the reading of magnetic information at an areal density of not less than 5 Gb/in².

3 Claims, 10 Drawing Sheets

U.S. PATENT DOCUMENTS

| | | | | |
|---|---|---|---|---|
| 6,134,084 A | * | 10/2000 | Ohwe et al. | 360/244.1 |
| 6,141,190 A | * | 10/2000 | Nakamoto et al. | 360/124 |
| 6,163,443 A | * | 12/2000 | Hatagami et al. | 360/323 |
| 6,181,514 B1 | * | 1/2001 | Santini et al. | 360/126 |
| 6,188,546 B1 | * | 2/2001 | Nakajima et al. | 360/234.5 |
| 6,201,667 B1 | * | 3/2001 | Yamamoto et al. | 360/264.2 |

* cited by examiner

FLOATING SURFACE

CROSS SECTION

FLOATING SURFACE

CROSS SECTION

FLOATING SURFACE

CROSS SECTION

MAGNETIC RECORDING AND READING DEVICE

CROSS REFERENCE TO RELATED APPLICATION

This is a continuation of U.S. application Ser. No. 09/377,189, filed Aug. 19, 1999, now U.S. Pat. No. 6,266,210, the subject matter of which is incorporated by reference herein and is related to U.S. application Ser. No. 09/725,317, filed Nov. 29, 2000, which is a continuation of U.S. application Ser. No. 09/377,189, now U.S. Pat. No. 6,266,210.

BACKGROUND OF THE INVENTION

The present invention relates to a magnetic disc device used in computers, information storage devices and so on, a magnetic storage device used in such information home appliances as digital VTRs, and a magnetic recording, and and, more particularly, to a magnetic recording and reading device suitable for realizing high-speed recording and reading, and for high-density recording.

Semiconductor memories, magnetic memories, etc., are used in the storage or recording devices of information equipment. Semiconductor memories are used in internal primary storage in the light of high-speed accessibility and magnetic memories are used in external secondary storages in the light of a high capacity, low cost and nonvolatile property. Magnetic disk devices, magnetic tapes and magnetic cards are the main current in the magnetic memories. A magnetic recording portion which produces a strong magnetic field is used in order for writing magnetic disks, magnetic tapes or magnetic cards. Further, reading portions based on the magnetoresistance effect or the electromagnetic induction effect are used in reading magnetic information recorded at a high density. In recent years, for reading, the giant magnetoresistance effect and the tunneling magnetoresistive effect have also begun to be examined. These functional portions for recording and reading are both installed in an input-output part which is called a magnetic head.

The basic configuration of a magnetic disk device is shown in FIGS. 10A and 10B. FIG. 10A shows a plan view of the device and FIG. 10B shows a vertical-sectional view of the device. Recording media 101-1 to 101-4 are fixed to a hub 104 to be rotated by a motor 100. In FIG. 10B shows one example which comprises four magnetic disks 101-1 to 101-4 and eight magnetic heads 102-1 to 102-8. However, the magnetic disk device may comprise at least one magnetic disk and at least one magnetic head. The magnetic heads 102-1 to 102-8 move on the rotating recording media. The magnetic heads 102-1 to 102-8 are supported by a rotary actuator 103 via arms 105-1 to 105-8. Suspensions 106-1 to 106-8 have function of the pressing the magnetic heads 102 against the recording media 101-1 to 101-4 under a determined load, respectively. A given electric circuit is needed for processing of reproduction signals and for inputting and outputting of information. Recently, a signal processing circuit in which waveform interference at high-density is positively utilized, such as PRML (Partial Response Maximum Likelihood) or EPRML (Extended PRML) which is an enhanced PRML, has been adopted, contributing greatly to a high-density design. The signal processing circuit is installed in a circuit board on a cover 108, etc.

The functional portion for writing and reading information on a magnetic head assembly is comprises components shown in FIG. 11A, for example. A writing portion 111 is comprised of a spiral coil 116 between magnetic poles 117, 118 which are magnetically connected with each other. The magnetic poles 117, 118 are both composed of a magnetic film pattern, which are made of an NiFe alloy, etc., respectively. The reading portion 112 comprises a magnetoresistance element 113 made of an NiFe alloy, etc. and an electrode 119 for applying a constant current or a constant voltage to the element 113 and for detecting changes in resistance. The magnetic pole 118, which is made of an NiFe alloy, etc. and serves also as a magnetic shielding layer, is provided between the writing and reading portions. There is further a shielding layer 115 underneath the magnetoresistance element 113. A reading resolution is determined by the clearance distance between the shielding layer 115 and the magnetic pole 118 (serving also as another shielding layer). The functional portion is formed on a magnetic head slider 1110 (FIG. 11B) via an underlayer 114 made of $Al_2O_3$, etc. Incidentally, the magnetic head slider, which is provided with a protection layer made of hard-carbon, etc. on the surface opposed to the magnetic recording medium, is supported by a gimbal 1111 and a suspension 1113, as shown in FIG. 11B. The magnetic head slider moves relatively to the magnetic recording medium while floating from the medium surface and, after positioning in an arbitrary position by an arm 1114 connected to a motor, realizes the function of writing or reading magnetic information via lead lines 1116 and 1115. With respect to the above function, there is also provided an electric control circuit together with the aforementioned signal processing unit or on the head carriage.

A detailed structure of a recording medium is schematically shown in FIG. 12. As described in JP-A-3-16013, most of the conventionally used recording media are produced by forming a magnetic layer 123 made of a Co—Cr—Ta alloy, or a Co—Cr—Pt alloy, etc. on a non-magnetic substrate made of Al plated with an NiP alloy, a glass, a high-hardness ceramics, a polished Si or the like, or a plastic substrate 121 by the sputtering method, or the evaporation method, or the plating method, etc. Usually, an under layer 122 made of Cr, or a Cr alloy, etc. for orientation control of the magnetic layer is often formed on the substrate. Furthermore, a protection film 124 made of diamond-like carbon containing nitrogen and/or hydrogen, or $SiO_2$ or SiN or $ZrO_2$, etc. is provided to ensure durability of sliding resistance, and a lubricating film 125 made of perfluoro alkyl polyether having an adsorptive or a reactive end group, or organic fatty acids, etc. is provided.

In addition to the magnetic recording device, magneto-optic recording devices that perform recording and reading on a magnetic recording medium through the use of light have also been put to practical use. The magneto-optic recording devices are classified into one type in which recording is performed only by light modulation and another type in which recording and reproduction are performed by light with a modulated magnetic field. However, the both types greatly rely on heat when recording and reading. Therefore, according to such type of devices, it is impossible to perform recording and reading in high data transfer rate and thus they have been adopted mainly in backup systems, etc.

The importance of a storage device is determined by its storage capacity and the speed during inputting-outputting operations. In order to increase competitiveness of products, it is necessary for the storage device to increase capacity by higher recording density, higher rotational speed and higher data transfer rate than those of the prior art. Thus, an important problem to be solved by the present invention is to provide a device capable of recording and reading at a high data transfer rate of not less than 50 MB/s and, more preferably, that at a high density of not less than 5 Gb/in$^2$. A magnetic recording medium capable of recording and reading at a high frequency and capable of obtaining a high S/N ratio at a high density and a magnetic head capable of generating a sufficient magnetic recording field at a high frequency are necessary for meeting the requirement.

In conventional magnetic recording media, there have been proposed and actually carried out to reduce noise by refining crystal grains in order to obtain a high S/N ratio at a high density of about 1 to 3 Gb/in$^2$, and by promoting segregation of non-magnetic components at grain boundaries to reduce exchange coupling among crystal grains as being taught in JP-A-63-148411, JP-A-3-16013 and JP-A-63-234407 so as to make the coercive squareness S* to not more than 0.85 and the rotational hysteresis loss RH to the range of 0.4 to 1.3. Noise can be considerably reduced by recording and reading at a data transfer rate of not more than about 20 MB/s. However, when the magnetic recording was carried out on that film media of the prior art at a high frequency of not less than 50 MB/s, thermal fluctuation effects in fine magnetic crystallines is remarkable due to weak exchange coupling among crystal grains and the apparent coercive force is high resulting in that it was impossible to record on it accurately. Furthermore, even when recording is performed under a large current with utilization of a modified recording circuit, etc., the magnetic recording transition region is widened due to a broad magnetic recording field resulting in that noise increases and/or recorded information is lost when it was alowed to stand for a long time.

SUMMARY OF THE INVENTION

An object of the present invention is to provide a low-noise magnetic recording medium composed of fine crystal grains which is capable of recording and reading at a high data transfer rate of not less than 50 MB/s and further permits high-density recording at not less than about 5 Gb/in$^2$, a recording and reading magnetic head with high reading sensitivity which is capable of sufficiently sharp recording on the medium, and a magnetic recording device of a high data transfer rate and high density which is realized by using the magnetic recording medium and the magnetic head of the present invention.

In order to achieve the above object, the present inventors pushed forward studies on chemical compositions of magnetic recording media, deposition processes and technologies related to devices such as magnetic heads, and found out that the following means are very effective.

There is proposed a magnetic recording medium with a magnetic layer comprising at least one metal element selected from the group consisting of Co, Fe and Ni as a primary component, at least two elements selected from a second group consisting of Cr, Mo, W, V, Nb, Ta, Ti, Zr, Hf, Pd, Pt, Rh, Ir and Si, and at least one element selected from a third group consisting of La, Ce, Pr, Nd, Pm, Sm, Eu, Gd, Tb, Dy, Ho, Er, Tm, Yb, Lu, Bi, Sb, Pb, Sn, Ge and B. According to the magnetic recording medium, it is possible to obtain a high S/N (signal-to-noise) ratio even under recording at high data transfer rate of not less than 50 MB/s and to reduce the absolute value of normalized noise coefficient per a unit transition $\sqrt{Nd^2-No^2}\cdot\sqrt{Tw}/(S_0\cdot D)$ (Nd: recorded media noise, No: DC erase noise, Tw: effective read track width, $S_0$: isolated pulse output, D: recording density in the unit of flux change per inch) to not more than $2.5\times10^{-8}$ ($\mu$Vrms) (inch)($\mu$m)$^{0.5}$/($\mu$Vpp)

The invention can provide a magnetic recording device which can perform recording at a high data transfer rate of not less than 50 MB/s by using the above magnetic recording medium, a magnetic recording head and an R/W-IC having the following features; that is, the magnetic recording head assembly is given a total inductance reduced to not more than 65 nH because it has a magnetic core length of not more than 35 $\mu$m, because it is provided with a magnetic film with a resistivity exceeding 50 $\mu\Omega$cm or a multilayer film composed of a magnetic film and an insulating film in part of the magnetic core, and further because it is mounted on an integrated circuit suspension; and the R/W-IC produced using a process of a line width of not more than 0.35 $\mu$m and is capable of operating at high frequencies. Furthermore, the magnetic recording device of the present invention can perform the reading of magnetic information at a high density of not less than 5 Gb/in$^2$ by using a magnetic head provided with a read element having a giant magnetoresistance effect or a tunneling-magnetoresistance effect and with an effective track width of not more than 0.9 $\mu$m.

Recording density can be increased about 20% by forming the magnetic layer of the magnetic recording medium through a non-magnetic intermediate layer comprising at least one element selected from the group consisting of Cr, Mo, W, V, Nb, Ta, Zr, Hf, Ti, Ge, Si, Co, Ni, C and B as a primary component.

A magnetic recording and reading device of higher density can be provided by performing magnetic recording immediately after heat application to a magnetic recording medium through the use of a semiconductor laser, etc. and performing reading with the aid of the above giant magnetoresistance effect element or an element having a tunneling-magnetoresistive thin film.

Furthermore, in order to shorten an access time and perform positioning with higher accuracy, it is effective to adopt a rotary type actuator to position the head in at least two stages of coarse and fine movement adjustments.

The present inventors pushed forward on read-and-write properties of a magnetic recording medium as shown in FIG. 12, which is fabricated by forming a magnetic layer of a Co alloy, etc., a protective layer of C-N, etc., and a lubricating layer of perfluoro-alkyl-polyether, etc., in this order, directly on a non-magnetic substrate or via a non-magnetic underlayer which comprises at least one element selected from the group consisting of Cr, Mo, W, Ta, V, Nb, Ta, Ti, Ge, Si, Co and Ni as a primary component, the above magnetic layer was formed by controlling film deposition conditions, such as substrate temperature, atmosphere and deposition rate, heat treatment conditions, compositions of magnetic layer or under layer, a thickness of each layer, crystalline, the number Cf layers, etc. At a recording density of 3 Gb/in$^2$ and at 10 kprm, these magnetic media were evaluated through the use of a conventional magnetic head with the MR element as shown in FIGS. 11A and 11B on a conventional magnetic disk device as shown in FIGS. 10A and 10B. As a result, the present inventors found out that by giving the above magnetic layer of a composition containing at least one metal element selected from the group consisting of Co, Fe and Ni as a primary component, and at least two elements selected from a second group consisting of Cr, Mo, W, V, Nb, Ta, Ti, Zr, Hf, Pd, Pt, Rh, Ir and Si, it is possible to refine crystal grains and reduce the exchange interaction among crystal grains and also to reduce the absolute value of normalized noise coefficient per recording density to not more than $3\times10^{-8}$ ($\mu$Vrms)(inch) ($\mu$m)$^{0.5}$/($\mu$Vpp) even when recording and reading are performed at a transfer rate of not more than 20 MB/s of conventional technology. This effect was remarkable especially during low-pressure, high-temperature and high-rate film depositions or during film depositions at a high pressure and a low deposition rate. Under other conditions, however, this effect was good enough by optimizing compositions and combinations.

On the other hand, in order to record at a high rate of not less than 50 MB/s, it was necessary to use an R/W-IC (Read and Write IC) which is capable of a high speed processing by putting fine-pattern-width for not more than 0.35 μm to partial use at least and, in addition, it was necessary to develop a magnetic recording head structure capable of generating a strong magnetic recording field at a high rate in response to this fast driving current. In order to prevent the deterioration of fast signals, it is important that the IC be installed in a position as close to the head as possible and it was desirable to reduce the distance to not more than 2 cm. The present inventors examined magnetic pole and head structures and materials for magnetic poles, and developed a magnetic head assembly with a total inductance reduced to not more than 65 nH in which the magnetic core length $l_1$ of a magnetic recording core composed of the lower magnetic pole 118 and the upper magnetic pole 117 in FIG. 11A is not more than 35 μm, and which is provided with a magnetic film with a resistivity exceeding 50 μΩcm or a multilayer film composed of a magnetic film and an insulating film in part of the magnetic poles composing the magnetic core, and which is mounted on a suspension 113 with an integrated conductive line through insulator 1116. Recording magnetic fields obtained by this magnetic head were evaluated with the aid of a magnetic field SEM, MFM, etc. As a result, the present inventors could ascertain that a sufficient magnetic field can be generated even at a data transfer rate of not less than 50 MB/s, and found out that recording at a transfer rate of not less than 50 MB/s is, in principle, possible. Materials for magnetic poles with a resistivity exceeding 50 μΩcm include, for example, NiFe-base alloys, such as 42Ni—57Fe—1Cr, 46Ni—52Fe—2Cr, 43Ni—56Fe—1Mo, 51Ni—47Fe—2S and 54Ni—43Fe—3P, and amorphous magnetic alloys, such as CoTaZr and CoNbZr. Examples of multilayer film composed of a magnetic film and an insulating film include a multilayer film composed of 89Fe—8Al—3Si and $SiO_2$ and a multilayer film composed of 80Ni—20Fe and $ZrO_2$.

When recording and reading on the above medium at 50 MB/s through the use of the magnetic head and circuit of the above construction, satisfactory recording was incapable due to a bad overwrite characteristic, etc. and besides noise increased twice or three times. Thus, it became apparent that further ideas are necessary for ensuring recording and reading both in high-density and high data transfer rate. Here, signals were read through the use of a conventional MR read element with a narrow track width of 2 μm.

The reason for the above phenomenon was examined. The present inventors considered that the above phenomenon is due to a bad frequency response in the recording characteristic of the medium. Therefore, the cause was analyzed by performing a simulation through the use of a super computer, etc. and as a result, it became evident that there is a problem in thermal fluctuations of magnetization and spin damping during recording process. Therefore, studies were carried out on medium additives capable of optimizing thermal fluctuations and damping coefficient. As a result, the present inventors found out that by adding at least one element selected from a third group consisting of La, Ce, Pr, Nd, Pm, Sm, Eu, Gd, Tb, Dy, Ho, Er, Tm, Yb, Lu, Bi, Sb, Pb, Sn, Ge and B to the composition of the above medium, it is possible to reduce the absolute value of normalized noise coefficient per recording density to not more than $2.5 \times 10^{-8}$ (μVrms)(inch) $(\mu m)^{0.5}/(\mu Vpp)$ even when recording is performed at 50 MB/s. This effect was observed when the above elements were added in amounts of not less than 0.1 at %. However, their addition in an amount of 0.1 at % is sufficient. Addition in amounts of not more than 0.1 at % was undesirable because of a remarkable decrease in output. Furthermore, the effect was remarkable when rare earth elements were added. The above effect was also ascertained in what is called a granular type medium in which a non-magnetic substance, such as $SiO_2$ and $ZrO_2$, and a magnetic material with a high crystalline anisotropy constant, such as CoPt and CoNiPt, were simultaneously formed by sputtering and the magnetic material with a high crystalline anisotropy constant was precipitated and dispersed by heat treatment at a temperature of about 300° C. to obtain the above composition. Furthermore, in a case where the above magnetic layer is made of an amorphous magnetic substance, the magnetic layer often has perpendicular anisotropy. However, the same effect was also observed in this case. Furthermore, in any of these instances, when the above magnetic layer was formed via a non-magnetic intermediate layer containing at least one element selected from the group consisting of Cr, Mo, W, V, Nb, Ta, Zr, Hf, Ti, Ge, Si, Co, Ni, C and B as a primary component, noise could be remarkably reduced because of statistical addition of signals and this was especially favorable for noise reduction. Furthermore, what is especially noteworthy is that by reducing the magnetic core length of the above magnetic head to not more than 50 μm, a sharp and strong magnetic field could be generated with increased efficiency and recording on a medium with a higher coercive force was possible. This is preferable because higher densities can be obtained. Furthermore, by installing the above R/W-IC near the suspension, the rise time of a recording magnetic field could be made further shorter. This permitted sharp recording and enabled medium noise to be relatively reduced. Therefore, this is more preferable.

In order to perform recording and reading at a high density of not less than 5 Gb/in$^2$, it was necessary to perform the reading of magnetic information through the use of a magnetic head having an effective read-track width of not more than 0.9 μm with giant magnetoresistive effect or tunneling-magnetoresistive effect, and performs the reading of magnetic information at a high density of not less than 5 Gb/in$^2$. By performing reading like this, a signal-to-noise ratio of not less than 20 dB of the device necessary for the operation of the device was obtained with the aid of the signal processing method and it was necessary to combine the magnetic head with signal processing such as EPRML or EEPRML, trellis coding, ECCs, etc. Incidentally, the giant magnetoresistive element (GMR) and tunneling magnetic head technologies are disclosed in JP-A-61-097906, JP-A-02-61572, JP-A-04-35831, JP-A-07-333015, JP-A-02-148643 and JP-A-02-218904. An effective track width of not more than 0.9 μm was realized by putting lithography technology based on an i-line stepper or a KrF stepper, FIB fabrication technology, etc. to full use.

The above system was a very epoch-making product as a magnetic disk. However, the present inventors found out that recording can be assisted by instantaneously heating a medium to the temperature range of from about 50° C. to 250° C. with a magnetic disk provided with a heat-generating portion and thereby reducing the coercive force at a high frequency, and that this idea is further effective. In other words, in this system the load put on the recording portion and the material for recording magnetic poles could be reduced, and recording at a high density of not less than 5 Gb/in$^2$ and a high data transfer rate of not less than 50

MB/s was possible even with a recording track width of not more than 0.9 μm and even when a magnetic pole material with a saturation magnetic flux density of 1 T was used. Thus, this was especially advantageous.

With respect to this effect, access time can also be shortened by performing magnetic recording immediately after heat application to a magnetic recording medium and performing reading with the aid of the above giant magnetoresistive element or element having a tunneling-magnetoresistive effect. This is further preferable.

Furthermore, by using a semiconductor laser chip as the above heat-generating portion, an effective head volume can be reduced and high-speed positioning becomes possible. This is especially preferable. In addition, in order to shorten access time and ensure positioning with a higher accuracy, it is especially effective to position the head by a rotary actuator method in at least two stages of coarse and fine movement adjustments.

EXAMPLE 1

Figure 1:
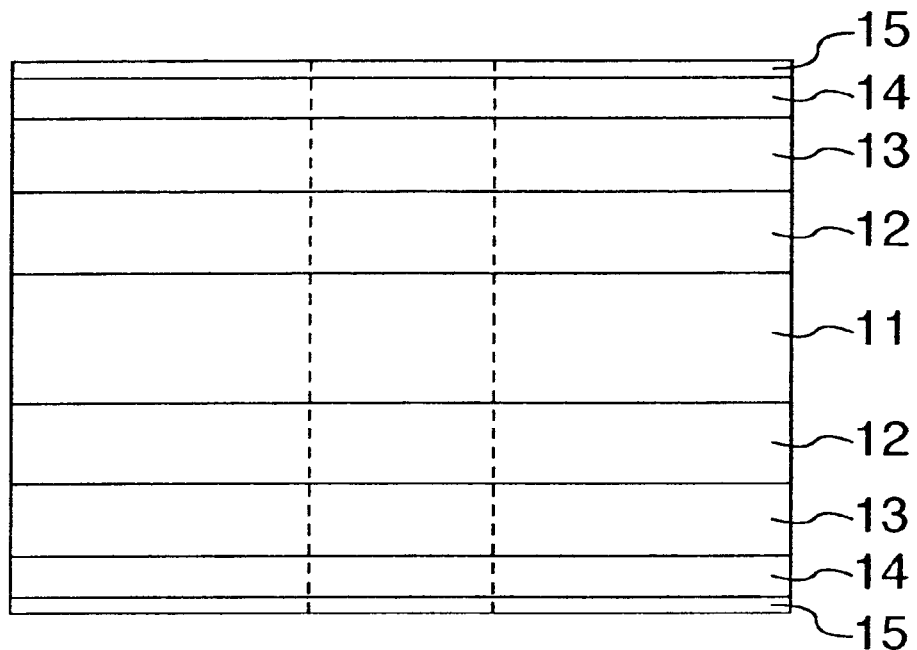
FIG. 1 shows schematically the essential portion of a magnetic recording medium of the invention.
Figure 2:
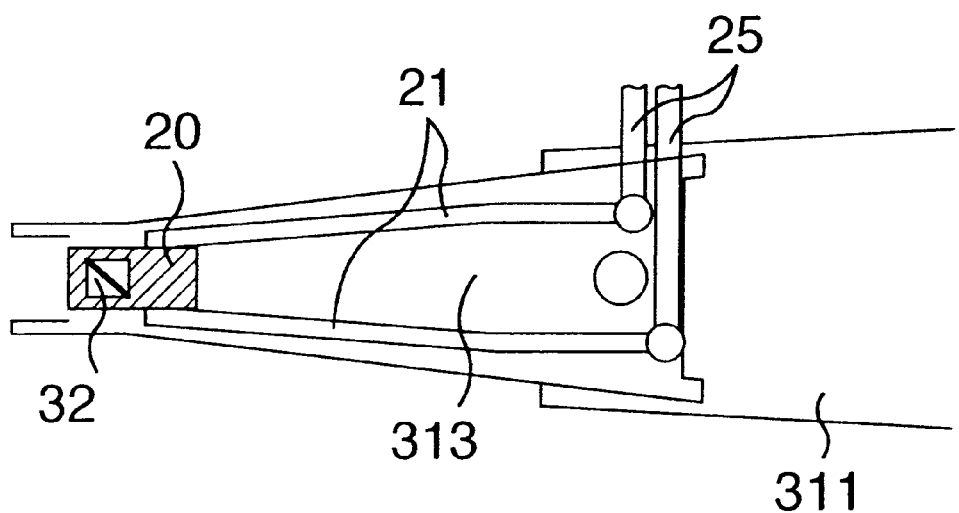
FIG. 2 shows schematically the essential portion of a magnetic head assembly of the invention.
Figure 3A:
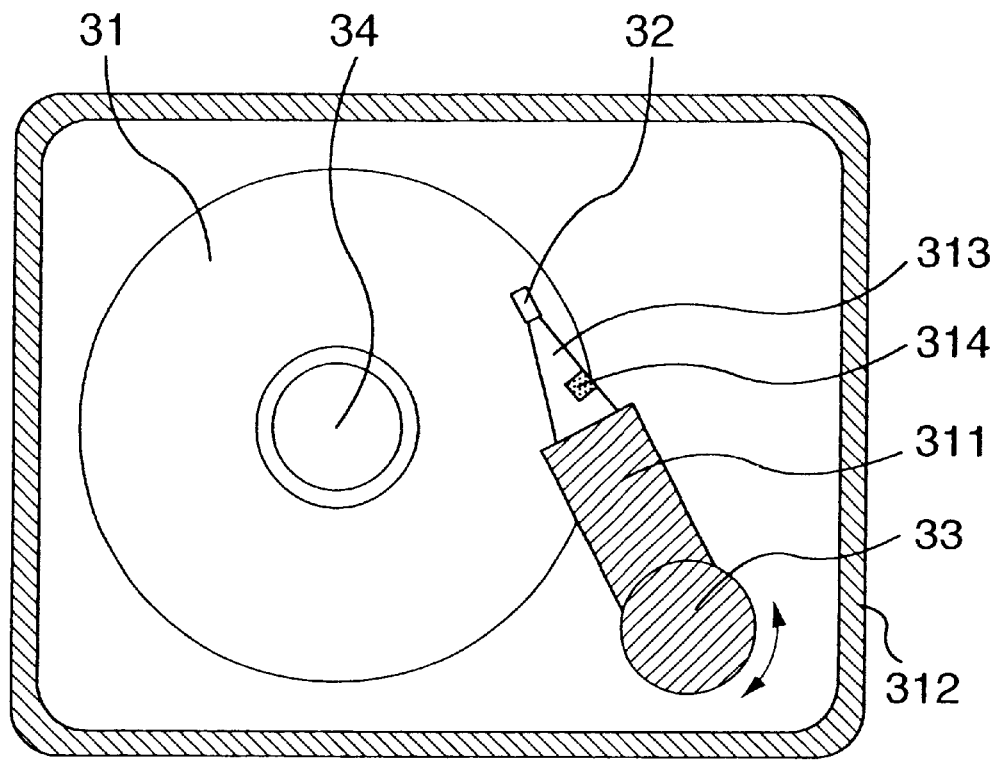
FIG. 3A shows schematically a plan view of a magnetic recording device of the invention.
Figure 3B:
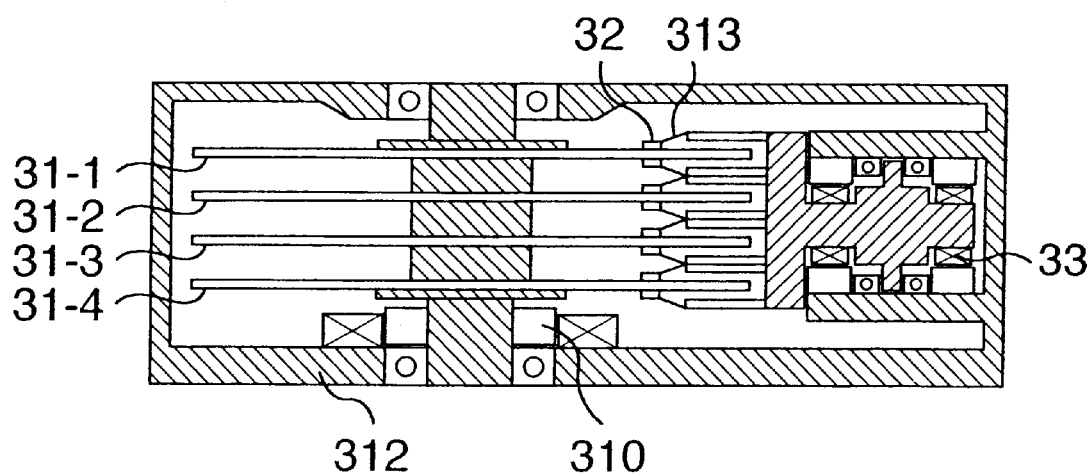
FIG. 3B shows a cross-sectional view of the magnetic recording device shown in FIG. 3A.
Figure 10A:
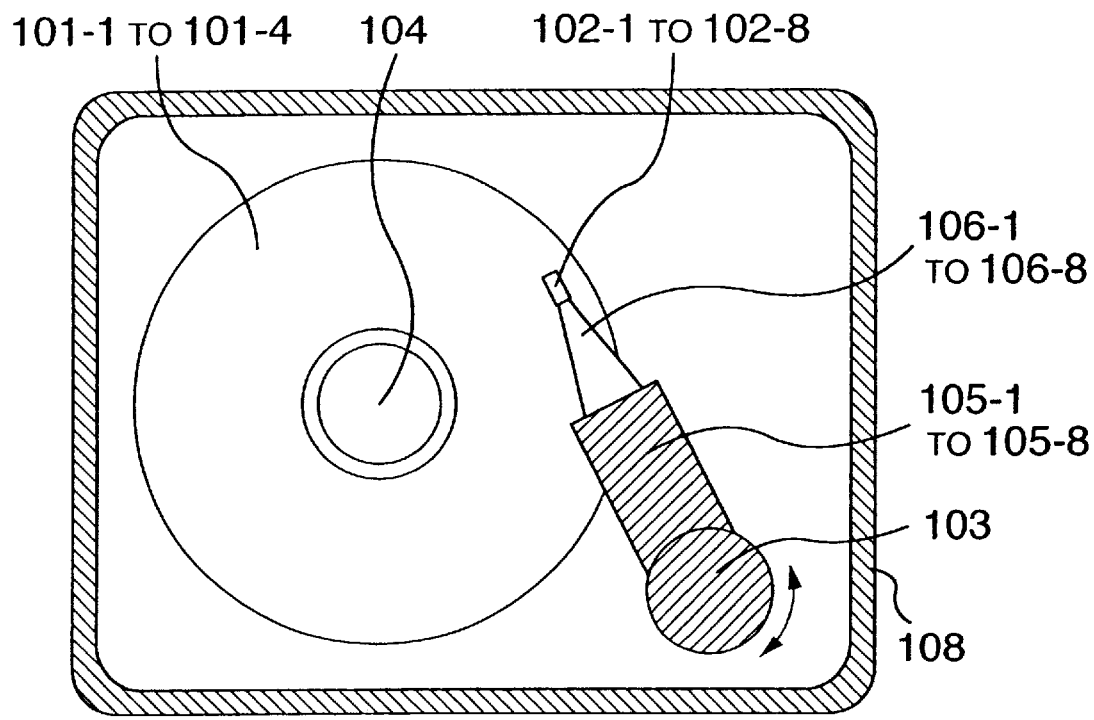
FIG. 10A shows schematically a plan view of a conventional magnetic disk device.
Figure 10B:
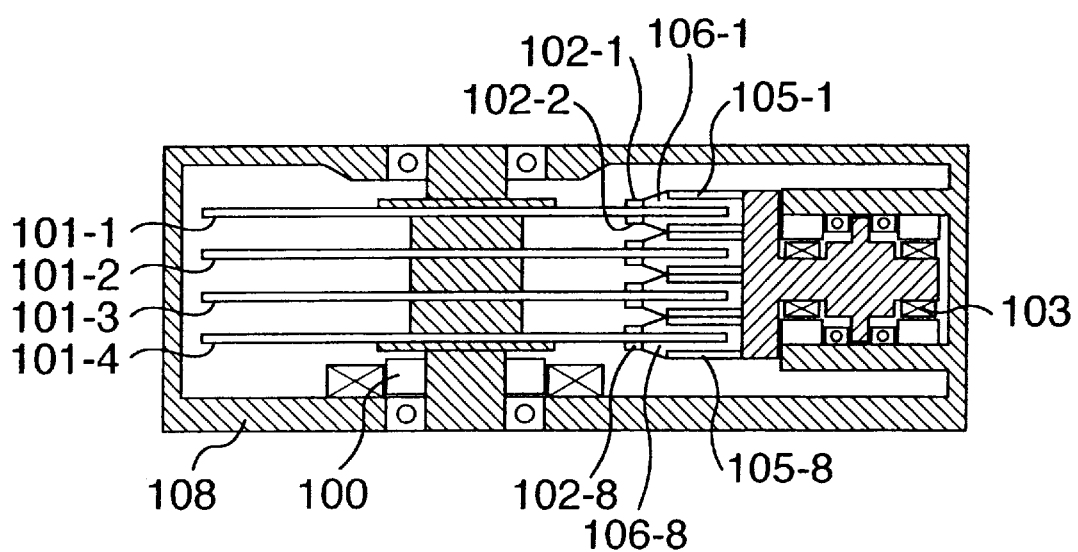
FIG. 10B shows a sectional view of the conventional magnetic disk device shown in FIG. 10A.

The magnetic disk of the invention is shown in FIGS. 3A and 3B. FIG. 3A is a plan view of the device and FIG. 3B is a sectional view of the device. In the device of the invention, a recording medium 31 of the invention, which will be described later in detail by referring to FIG. 1, is fixed to a rotary hub 34 and rotated by a motor 310, and recording is performed by a magnetic head 32, which will be described later in detail by referring to FIGS. 11A and 11B. The magnetic head 32 is supported by a rotary actuator 33 via an arm 311 and positioned fast and in a stable manner in a prescribed position of the rotating recording medium 31. In the drawing, the numeral 313 denotes a suspension and numeral 20 denotes a gimbal. As shown in FIG. 2 which illustrates the details of the suspension 313, the suspension 313 used in this device is an integrated circuit suspension in which the wiring 21 and an insulating layer are integrally formed on a plate spring through the use of the thin film technology so that the inductance of the wiring 21 is not more than 15 nH. Lead lines 25 are connected to the wiring 21. Usual wiring of twist wires and wiring with an inductance of not less than 15 nH, signals higher than 50 MB/s attenuate greatly. Thus, conventional types of wiring could not been adequately put to practical use when circuits of usual power were used. In a case where an R/W-IC portion 314 was formed on the above integrated circuit suspension 313, in which the thin-film wiring and insulating layer were directly formed on the plate spring, or an FPC for wiring, and the distance from the head was not more than 2 cm, the attenuation of signals was not practically observed and an improvement in transfer rate of not less than tens of megabytes per second was observed compared to a case where an R/W-IC was integrated with a signal processing circuit and mounted on a circuit board as conventionally. Thus, this was especially preferable. In this example of the invention, the distance was set at 1.5 and 1 cm. Incidentally, FIGS. 10A and 10B illustrates an example in which four magnetic disks 31-1 to 31-4 and eight magnetic heads 32 are mounted. However, at least one magnetic disk and at least one magnetic head may be installed. In this example of the present invention, 1 to 30 heads and 1 to 15 magnetic disks were mounted on a casing 312 of magnetic disk device shown in FIG. 3.

The same prescribed electric circuit as conventional technology is required for recording information, processing read signals and inputting/outputting information. In terms of power consumption, however, a circuit using a CMOS is advantageous in comparison with a circuit using a Bi-CMOS and it is necessary to downsize circuitry in order to perform recording and reading at a high rate of 50 MB/s. In all cases, therefore, it was necessary to adopt the patterning process for not more than 0.35 μm in fabricating a part of the R/W-IC. In an actual case where a patterning process for not less than 0.5 μm was adopted, good recording could not be performed. Incidentally, for channel LSIs for signal processing, etc., it is necessary to reduce the circuit scale in order to reduce power consumption and a patterning process for not more than 0.25 μm was adopted. In this example, a signal processing circuit in which waveform interference in the age of high-density design is positively utilized was introduced and separated from the above R/W-IC. This signal processing circuit is called MEEPRML (Modified EEPRML), in which EEPRML (Extended Extended Partial Response Maximum Likelihood) is enhanced and the ECC function is also enhanced. Furthermore, in the case of perpendicular magnetic recording, reading was performed by the PR5 signal processing method, etc. These components were installed in the circuit board on the cover 312, etc. The number of revolutions of the device was 10,000 rpm and the flying height was from 26 to 28 nm in all cases.

The medium and magnetic head of the present invention, which compose the magnetic recording and reading device of the present invention, is explained below in further detail.

First, the medium of the present invention is explained by referring to FIG. 1. The numeral 11 indicates a non-magnetic substrate which is made of glass, NiP-plated Al, ceramics, Si, plastics, etc. and formed on a disk with a diameter of, for example, 3.5", 2.5", 1.8", and 1", a tape or a card. The numeral 12 indicates a non-magnetic underlayer which is made of Cr, Mo, W, CrMo, CrTi, CrCo, NiCr, CoCr, Ta, TiCr, C, Ge, TiNb, etc. and contains at least one kind of element selected from the group consisting of Cr, Mo, W, V, Nb, Ta, Ti, Ge, Si, Co and Ni as a primary component. The numeral 13 indicates a hard magnetic layer which comprises a crystalline magnetic substance of CoCrPtLa, CoCrTaCe, CoNiPtPr, CoPtNd-SiO$_2$, FeNiCoCrPm, CoFePdTaSm, NiTaSiEu, CoWTaGd, CoNbVTb, GdFeCoPtTa, GdTbFeCoZrRh, FeRhSiBi—N, CoPtIrSn—CoO, etc., which crystalline magnetic substance contains at least one metal element selected from the group consisting of Co, Fe and Ni as a primary component, at least two elements selected from a second group consisting of Cr, Mo, W, V, Nb, Ta, Ti, Zr, Hf, Pd, Pt, Rh, Ir and Si, and a least one kind of element selected from a third group consisting of La, Ce, Pr, Nd, Pm, Sm, Eu, Gd, Tb, Dy, Ho, Er, Tm, Yb, Lu, Bi, Sb, Pb, Sn, Ge and B. This hard magnetic material has an absolute value of normalized noise coefficient per recording density of not more than $2.5 \times 10^{-8}$ ($\mu$Vrms)(inch)($\mu$m)$^{0.5}$/($\mu$Vpp). The numeral 14 indicates a protective layer made of C to which N and H are added in combination, H-added C, BN, ZrNbN, etc. The numeral 15 indicates a lubricant of perfluoro-alkyl-polyether having adsorptive or reactive end-groups such as OH and NH$_2$, an organic fatty acid, etc. Between the non-magnetic under layer 12 and the hard magnetic layer 13, there may be provided a second non-magnetic underlayer whose composition is further adjusted and which has a lattice constant capable of being more easily matched to that of the magnetic film. When the above magnetic layer is divided by a non-magnetic intermediate layer which contains at least one element selected from the group consisting of Cr, Mo, W, V, Nb, Ta, Zr, Hf, Ti, Ge, Si, Co, Ni, C and B as a primary component, noise decreases almost in proportion to the square root of the total number of magnetic layers. Therefore, this is more preferable.

Embodiments of medium of the present invention are explained below in further detail. The magnetic disks of the present invention shown in Table 1 were obtained by first forming an underlayer on a glass disk substrate with a diameter of 3.5, 2.5, 1.8 or 1 inch, then forming a magnetic layer of single-layer, two-layer or multilayer structure, a 10-nm thick carbon protective film to which 10% N is added, and finally forming a 5-nm thick lubricating film of perfluoro alkyl polyether having -OH end group after surface treatment. The above underlayer is made of the Cr alloys, Mo alloys, Ti alloys, W alloys, etc., which contains at least one element selected from the group consisting of Cr, Mo, W, V, Nb, Ta, Ti, Ge, Si, Co and Ni as a primary component. The above magnetic layer comprises a crystalline magnetic material of CoCrPtGd, CoCrPtTaNd, CoPtDy-SiO$_2$, FeCoNiMoTaBi, NiFeCrPtGe, FeNiTaIrSm, etc., which crystalline magnetic material contains at least one metal element selected from the group consisting of Co, Fe and Ni as a primary component, at least two elements selected from a second group consisting of Cr, Mo, W, V, Nb, Ta, Ti, Zr, Hf, Pd, Pt, Rh, Ir and Si, and at least one element selected from a third group consisting of La, Ce, Pr, Nd, Pm, Sm, Eu, Gd, Tb, Dy, Ho, Er, Tm, Yb, Lu, Bi, Sb, Pb, Sn, Ge and B.

The above underlayer and magnetic layer were both formed by means of a DC magnetron sputtering device and the above protective film was formed in an N$_2$ gas atmosphere by the plasma-induced reactive magnetron sputtering method. Incidentally, in this example, parameters could be varied independently of the underlayer and magnetic film each other and Ar pressures of from 1 to 10 m Torr, substrate temperatures of from 100 to 300° C. and deposition rates of from 0.1 to 1 nm/s were used. In the underlayer, Cr, Ta, Nb, V, Si and Ge or alloys such as Co60Cr40, Mo90—Cr10, Ta90—Cr10, Ni50Cr50, Cr90—V10, Cr90—Ti10, Ti95—Cr5, Ti—Ta15, Ti—Nb15, TiPd20, TiPt15, etc. were used as a single layer or two layers composed of dissimilar metal layers. Thus, samples of different underlayer compositions were prepared. The total film thickness of the underlayer was from 10 to 100 nm, that of the magnetic layer was from 10 to 100 nm, and that of the protective film was 10 nm. A multilayer medium 70 nm in thickness was also made by way of trial by depositing ten layers of a combination of 5-nm thick CoCr$_7$Pt$_6$Gd$_3$ and 2-nm thick Pt layers. The magnetic recording medium of the present invention was evaluated by SEM or TEM and it was found that the magnetic layer is predominantly composed of fine crystal grains with their average grain sizes of not more than 12 nm and not less than 8 nm for both longitudinal and perpendicular media.

TABLE 1

| | Magnetic layer (nm) | Under layer (nm) | Ar sputtering pressure (mTorr) | Temperature of substrate (° C.) | Orientation of magnetic layer |
|---|---|---|---|---|---|
| 1 | CoCr$_{15}$Pt$_8$La$_4$ (25) | CrTi (40) | 2 | 250 | in-plane |
| 2 | CoMo$_{15}$Pt$_8$Ce$_1$ (25) | CrTI (60) | 2 | 250 | in-plane |
| 3 | CoW$_{19}$Pt$_4$Pr$_2$ (25) | CrTi (100) | 2 | 250 | in-plane |
| 4 | CoCr$_{15}$Pt$_8$Ta$_4$Nd$_4$ (28) | MoCr (10) | 5 | 100 | in-plane |
| 5 | CoCr$_{16}$Pt$_{10}$Ta$_3$Pm$_5$ (28) | MoCr (20) | 5 | 150 | in-plane |
| 6 | CoCr$_{17}$Pt$_{10}$Ta$_2$Sm$_3$ (28) | MoCr (30) | 5 | 200 | in-plane |
| 7 | CoCr$_{13}$Pt$_8$V$_5$Eu$_4$ (35) | CrV (10) | 10 | 300 | in-plane |
| 8 | CoCr$_{16}$Pt$_{12}$Nb$_2$Gd$_6$ (35) | Wsi (20) | 10 | 300 | in-plane |
| 9 | CoCr$_{15}$Pt$_{15}$V$_4$Tb$_4$ (35) | CoCr (30) | 10 | 300 | in-plane |
| 10 | NiFe$_{10}$Cr$_{10}$Ir$_4$Dy$_4$ (26) | NiCr (20) | 1 | 209 | in-plane |
| 11 | FeNi$_{30}$Ta$_5$Rh$_4$Ho$_2$ (18) | MoCr (30) | 2 | 250 | in-plane |
| 12 | FeCr$_{19}$Pt$_8$Er$_7$ (29) | CoCr (50) | 2 | 275 | in-plane |
| 13 | CoPt$_{20}$Ir$_4$Tm$_1$—SiO$_2$ (25) | Ta (45) | 1 | 250 | in-plane |
| 14 | CoPt$_{15}$Ni$_4$Yb$_8$—ZrO$_2$ (25) | V (30) | 1 | 181 | in-plane |

TABLE 1-continued

| | Magnetic layer (nm) | Under layer (nm) | Ar sputtering pressure (mTorr) | Temperature of substrate (° C.) | Orientation of magnetic layer |
|---|---|---|---|---|---|
| 15 | $CoNi_{22}Pt_{20}Pd_4Lu_{0.5}$—$SiO_2$ (22) | Nb (50) | 1 | 224 | in-plane |
| 16 | $CoCr_{23}Pt_{10}Ti_5Bi_4$ (100) | TiCr (50) | 2 | 174 | perpendicular |
| 17 | $CoCr_{23}Pt_{10}Ti_5Bi_4$ (100) | TiCr (50) | 3 | 160 | perpendicular |
| 18 | $CoCr_{21}Pt_8Hf_3Sn_4$ (60) | TiTa (50) | 4 | 156 | perpendicular |
| 19 | $CoCr_{22}Pt_8Pd_3Ge_{15}$ (50) | CoTaZr (50) | 6 | 140 | perpendicular |
| 20 | $CoCr_{22}Pt_6Rh_2B_{0.1}$ (40) | CoNbZr (50) | 6 | 106 | perpendicular |
| 21 | $CoCr_{22}Pt_6si_2Sm_4$ (50) | TiPd (50) | 6 | 191 | perpendicular |
| 22 | $CoCr_7Pt_6Gd_3$/Pt (70) | SiN (50) | 5 | 151 | perpendicular |

Figure 11A:
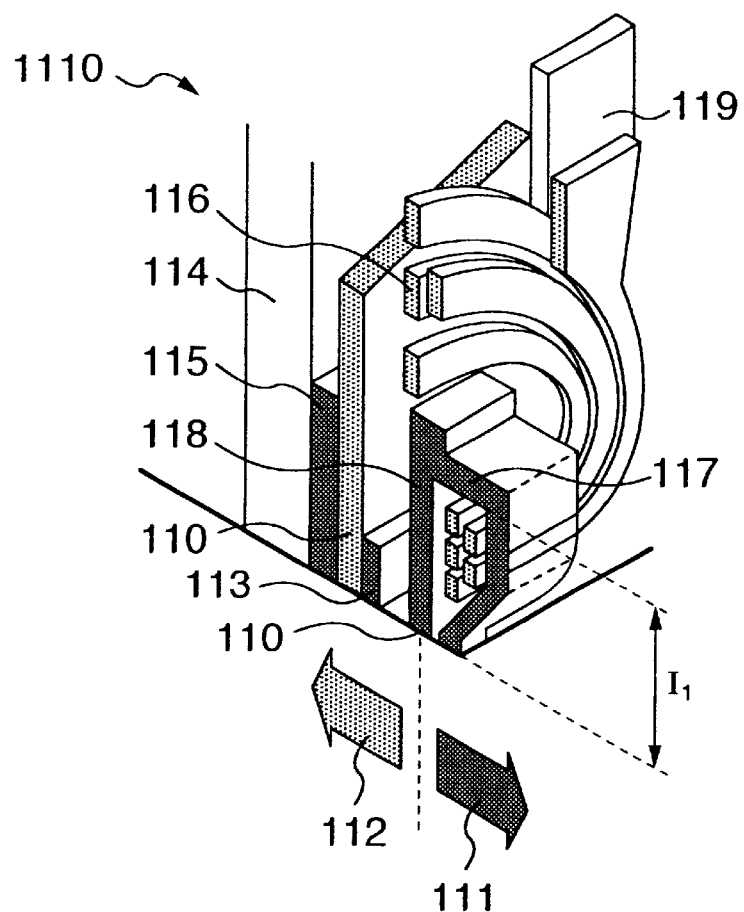
FIG. 11A shows schematically a partial sectional view of the essential portion of a conventional magnetic head with write and read elements.
Figure 11B:
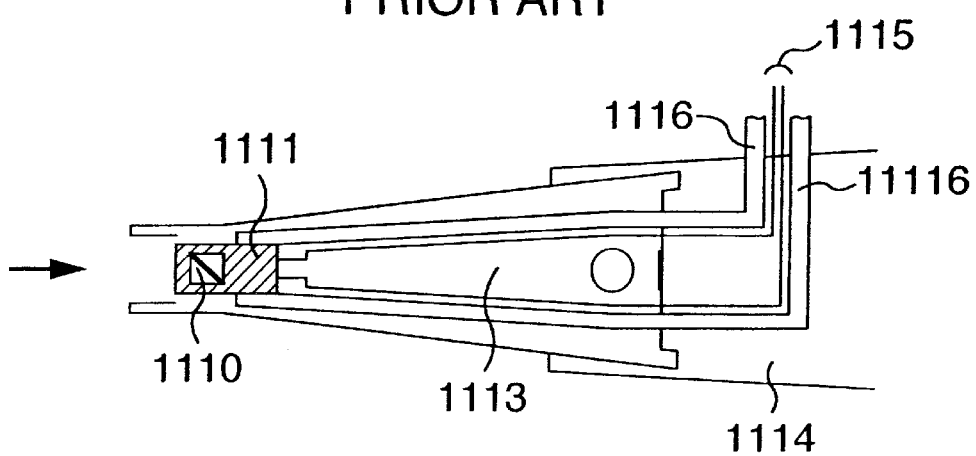
FIG. 11B shows schematically the conventional magnetic head shown in FIG. 11A.
Figure 12:
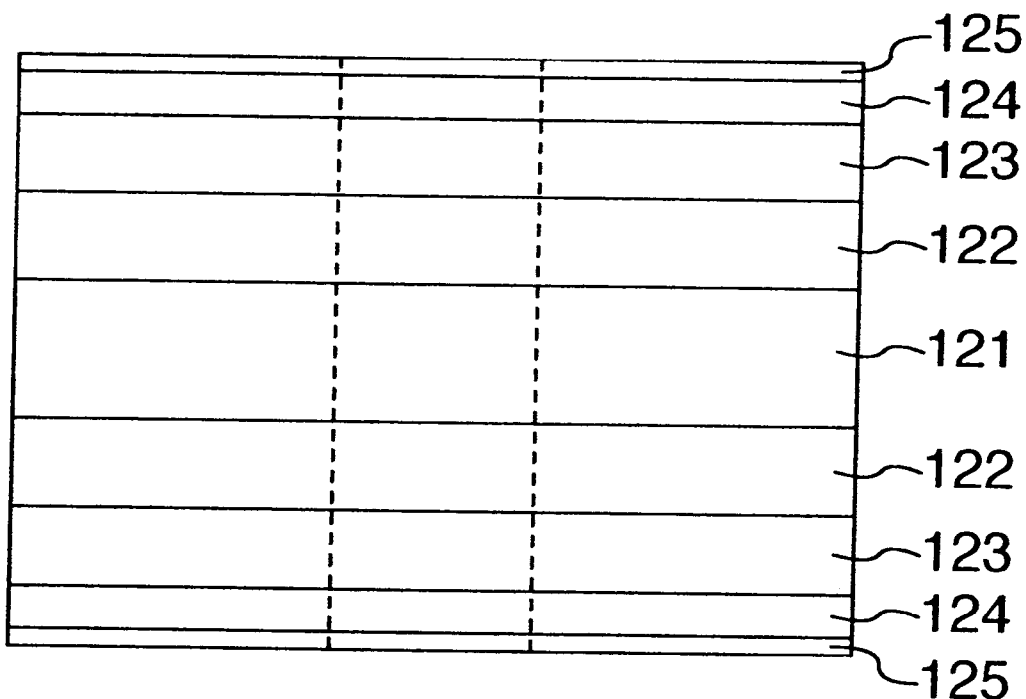
FIG. 12 shows schematically the essential portion of a conventional magnetic recording medium.

Next, the magnetic head of the present invention is explained by referring to FIG. 2 and FIG. 11A. A magnetic pole 117 of 43Ni—57Fe with a saturation magnetic flux density of 1.5 T and a resistivity of 50 $\mu\Omega$cm and another magnetic pole 118 of Ni80Fe20 with a saturation magnetic flux density of 1.0 T and a resistivity of 28 $\mu\Omega$cm were formed by the frame plating method. Cu wiring of 2 layers and 15 turns was formed within a magnetic core length $l_1$ of 35 $\mu$m. The length of a record gap 111 was 0.32 $\mu$m (material for the gap: $Al_2O_3$). Furthermore, the read element was fabricated as follows. A magnetically free NiFe/Co film (6 nm), a Cu film (2.5 nm), a magnetically fixed layer CoFe film (5 nm) and a CrMnPt film (25 nm) were first formed one after another and a rectangular pattern was obtained. After that, a permanent magnet of Co80—Ni15—Pt5 (15 nm)/Cr (12 nm) and an electrode film of Ta (120 mm) were arranged on both ends of the pattern and a giant magnetoresistive element with a track width of 0.9 $\mu$m, which is determined by the gap distance between the electrodes, was provided on a 2-$\mu$m thick plated shielding film of Ni80—Fe20 by the i-line lithography technology, thereby giving this structure to the read element (shield gap: 0.15 $\mu$m, material for the gap: $Al_2O_3$). The magnetic head element provided with this read element was formed on a slider made of $Al_2O_3$—TiC with a size of 1.0×0.8×0.2 mm³. Incidentally, the recording track width was trimmed to 1.1 $\mu$m from the floating surface side by the FIB (Focused Ion Beam) fabrication technology and a shaped rail structure was fabricated to the floating surface of the head. In addition, to improve the anti-adhesive property minute projections were provided at three points of the floating surface and a C/Si protective film with a total thickness of 3 nm was formed on the floating surface. As shown in FIG. 3, this head, along with an RW-IC 314 for which the scaledown process for 0.35 $\mu$m in this example was adopted, was fixed with an adhesive to an integrated circuit suspension 313 of the present invention on which a conductive line pattern through an insulating film were formed by the thin film fabrication process. A magnetic head assembly was thus obtained. As a result of the foregoing, in the integrated circuit suspension of the present invention for a disk with a diameter of 3.5, 2.5, 1.8 or 1 inch, the total inductance of the head assembly measured from R/W IC terminals at 10 MHz was 65, 63, 61 and 57 nH, respectively, not more than 65 nH.

Incidentally, heads with a magnetic core length $l_1$ of 25, 30 and 40 $\mu$m were also made by changing the number of turns to 9, 11 and 13, respectively. When the magnetic core length was 40 $\mu$m, in the integrated circuit suspension of the present invention for a disk with a diameter of 3.5, 2.5, 1.8 or 1 inch, the total inductance was as large as 75, 73, 71 and 68 nH, respectively. In these cases, the overwrite characteristic at 50 MB/s was as low as 20 dB, sufficiently sharp recording could not be performed, and noise was very large. Thus, these heads could not be put to practical use. From the above, it became apparent that it is necessary that the magnetic core length be not more than 35 $\mu$m and that the total inductance be not more than 65 nH. Table 1 shows only cases in which goods results were obtained with an overwrite characteristic of not less than 30 dB. Furthermore, when the characteristic was evaluated on a tunneling magnetic head with a read track width of 0.85 $\mu$m, made by the technology stated in JP-A-02-148643 and JP-A-02-218904, quite the same result was obtained. With a conventional MR head having the same track width for comparison, however, even in a case where the condition of the device was evaluated through the use of a signal processing circuit of the EEPRML type by the lithography process of 0.25 $\mu$m, sufficient read output and error rates could not be obtained. Thus, this conventional MR head could not bear the evaluation.

The device characteristics of the present invention are described blow. A signal processing circuit of the EEPRML type by the lithography process of 0.25 $\mu$m was used. In order to perform high-density, high data rate recording with high quality and a high signal-to-noise ratio for the characteristic in each record track position, it is necessary to ensure a strong and sharp recording magnetic field at a high frequency and, at the same time, it is necessary to reduce the irregularity of the saw tooth magnetic domains at record bit boundaries by reducing the crystalline grainsize in the medium and also reducing the exchange interaction among magnetic crystalline grains, to reduce the noise at bit boundaries that increases in proportion to recording density, and to ensure an appropriate response to a high-frequency magnetic field by optimizing the damping of magnetization during recording. For comparison, media were made without the addition of only the third group of elements so that these media correspond to those given in Table 1. On the media of these comparative examples, when recording was performed at a transfer rate of not less than 20 MB/s, the absolute value of normalized noise coefficient per recording density increased abruptly at 5 Gb/in² even when the above-mentioned head and R/W-IC were used. When recording was performed at 50 MB/s, the absolute value of normalized noise coefficient per recording density reached large values of from 10 to 30×10⁻⁸ ($\mu$Vrms)(inch) $(\mu m)^{0.5}/(\mu Vpp)$ and the bit error rate of the device was worse than 10⁻⁵. Thus, these medium could not be used for practical use. In contrast, all the media of the embodiments shown in Table 1 had an absolute value of normalized noise coefficient per recording density of from 1 to 2.5×10⁻⁸ ($\mu$Vrms)(inch)$(\mu m)^{0.5}/(\mu Vpp)$, which are not more than 2.5×10⁻⁸ ($\mu$Vrms)(inch)$(\mu m)^{0.5}/$ ($\mu$Vpp), and the bit error rate was better than $10^{-9}$ even under the conditions of both 5 Gb/in$^2$ and 50 MB/s. Thus, it became apparent that these media of this example were especially preferable.

Figure 9:
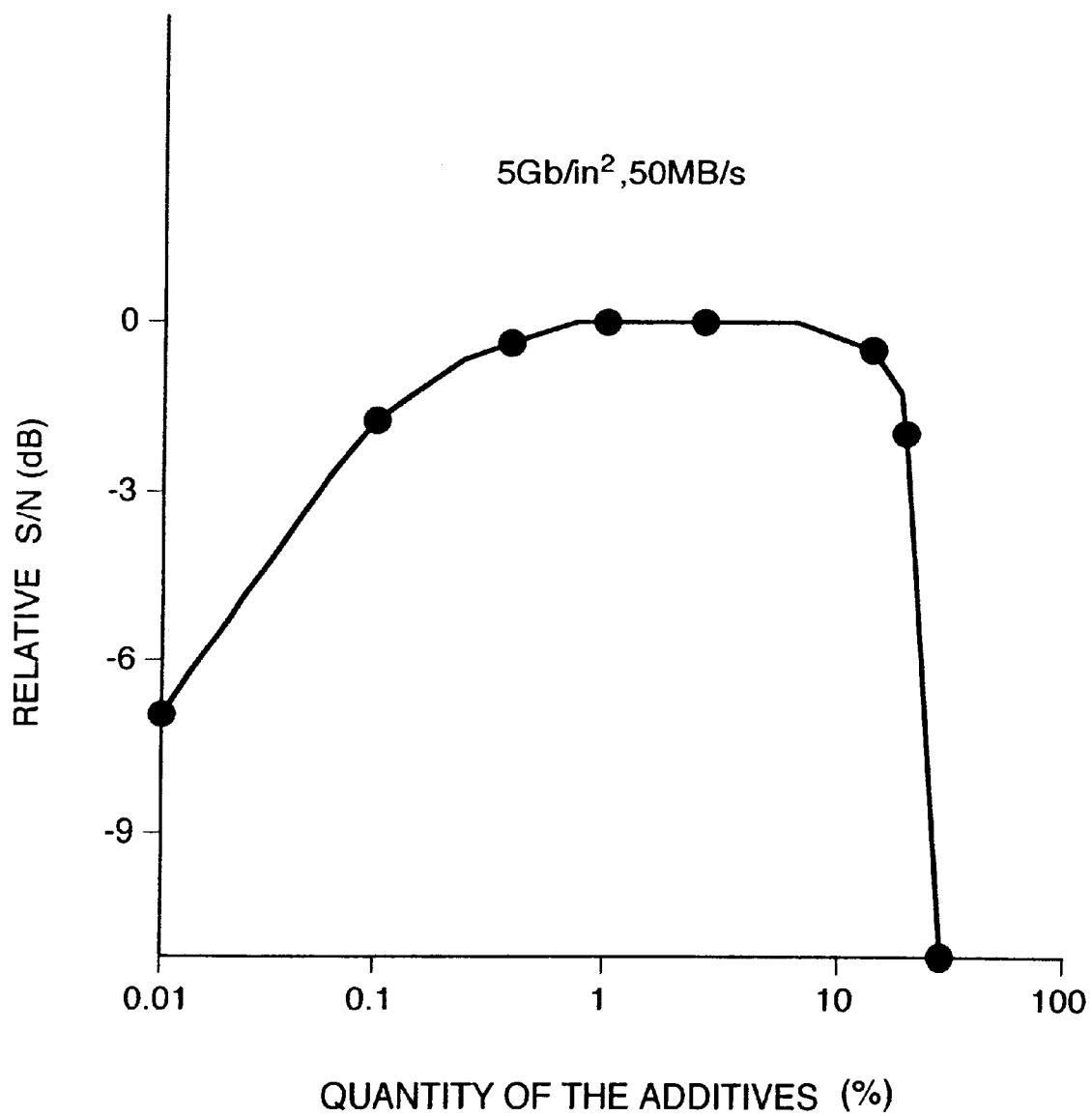
FIG. 9 is a graph showing an effect of additive elements.

For the effect of the elements of third group to a medium, cases with additives of from 0.1 to 15% were described in this example. However, as is apparent from FIG. 9 which shows cases with varied La contents of 0.01, 0.1, 0.5, 1, 2, 10, 15, and 20 at % under the conditions of #1 of Example 1, the signal-to-noise ratio in recording at 50 MB/s improved remarkably. The effect is sufficient when the quantity of additives is 1 at %. The output and signal-to-noise ratio decreased remarkably when the quantity of additives was not less than 15 at % and, therefore, this was not preferable. Furthermore, the effect was especially remarkable when rare earth elements were added.

A medium of another embodiment was prepared under the same conditions as those for the above first embodiment of Example 1 by dividing the magnetic layer into two layers by a non-magnetic intermediate layer, which contains as a main element at least one selected from the group consisting of Cr, Mo, W, V, Nb, Ta, Zr, Hf, Ti, Ge, Si, Co, Ni, C and B singly or Cr—Ti10, Mo—Cr10, W—Si5, Ta—Si5, Nb—Zr10, Ta—Cr5, Zr—Hf10, Hf—Ti5, Ti—Si10, Ge—Pt5, Si—Ru11, Co—Cr30, C—N10, B—N10, etc. However, noise reduced to approximately 70% and the device operated adequately even under the conditions of both 7 Gb/in$^2$ and 50 MB/s. Thus, the effect was more remarkable. It is needless to say that the above effect does not depend on the diameter of a disk or forms of medium such as a disk, tape and card.

EXAMPLE 2

Figure 4:
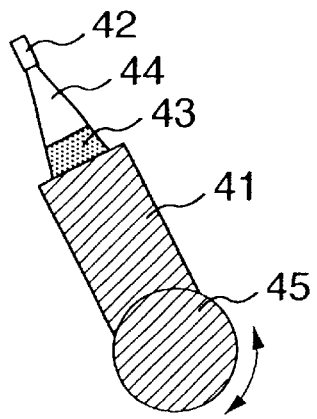
FIG. 4 shows schematically the essential portion of another magnetic head assembly of the invention.

Another example of the present invention is explained by referring to the conceptual drawing of a magnetic head assembly shown in FIG. 4. For a magnetic head 42, first as recording elements, 40Ni—55Fe—5Cr with a saturation magnetic flux density of 1.4 T and a resistivity of 60 $\mu\Omega$cm was used as the material for a magnetic pole 117 with a track width of 0.6 $\mu$m and another magnetic pole 118 was formed from CoTaZr with a resistivity of 120 $\mu\Omega$cm in FIG. 11A. Track width fabrication was performed by trimming on the basis of the FIB technology as with Example 1. A record gap length of 0.25 $\mu$m (material for the gap: Al$_2$O$_3$—3%SiO$_2$) was selected, the magnetic core length l$_1$ was 30 $\mu$m, and an Al coil 116 of 2 layers and 12 turns was used. Furthermore, the read element was fabricated as follows. A magnetically free NiFe/Co film (6 nm), a CuNi film (2.5 nm), a magnetically fixed layer of CoFe/Ru/CoFe film (6 nm) and an MnIr film (15 nm) were first formed one after another and a rectangular pattern was fabricated. After that, a permanent magnet of Co75—Cr15—Pt12 (10 nm)/CrTi (5 nm) and an electrode film of Nb (100 mm) were arranged on both ends of the pattern and the above giant magnetoresistive element with a track width of 0.5 $\mu$m, which is determined by the distance between the electrodes, was provided on a 2.5-$\mu$m thick plated shielding layer of Ni80—Fe20 through an 0.45 $\mu$m thick shield gap 110 in FIG. 11A of Al$_2$O$_3$, thereby giving this structure to the read element (total shield gap: 0.20 $\mu$m, material for the gap: ZrO$_2$). A magnetic head 42 was obtained by forming this element on a slider made of Al$_2$O$_3$-TiC with a size of 1.0×0.8×0.2 mm$^3$. The magnetic head assembly was obtained by mounting this head on an integrated circuit suspension of the present invention of FIG. 4 in which lead pattern through an insulating layer were formed by the thin film fabrication process.

In FIG. 4, with the assistance of a fine adjustment portion 43 of electromagnetic drive, etc. capable of position corrections of about 10 $\mu$m at a high rate, a suspension 44 has the function of positioning a magnetic head 42 in the prescribed position of the recording medium at a high speed in collaboration with the rough movement function of a rotary air actuator 45. For this reason, in Example 2, the R/W-IC of this example fabricated by the processes for 0.35 and 0.25 $\mu$m line widths was mounted on a wiring FPC (Flexible Printed Circuit) installed adjacent to an integrated circuit suspension in which lead pattern was formed by the thin film process, and its distance from the head was 3, 2, 1.5, 1 and 0.7 cm. Incidentally, a signal processing LSI of the EEPRML by the scaledown process for 0.25 $\mu$m was used. Incidentally, the fine adjustment portion 43 is not limited to a fine movement means of the electromagnetic force drive type and may be a fine movement means of the piezoelectric force drive type, magnetostrictive force drive type, etc. As a result of a comparison and examination, it was found that the type in which a multilayer piezoelectric device is used has the least adverse effect on power consumption and the read element of GMR or MR. However, the other types also met required functions. Another disk device of the present invention was obtained by mounting this head assembly on a magnetic disk device of the present invention shown in FIGS. 3A and 3B and by using the media of 2.5" and 1.8" diameters shown Table 1 and the same circuit as in Example 1. In Example 2, combinations of 1 to 10 media and 1 to 20 heads were used. Incidentally, a slider of shaped rail structure with three minute projections was used and a 3-nm thick protective film of C-N-H was provided on the bearing surface. However, during the evaluation, the flying height of the magnetic head was 25 nm and the number of revolutions was 15,000 and 25,000 rpm.

In all the combinations, the device operated adequately in a condition better than a bit error rate of $10^{-9}$ under the conditions of 10 Gb/in$^2$ and 50 MB/s. Thus, this effect was more remarkable. At 20,000 rpm, recording was severer and the device operated in a condition better than a bit error rate of $10^{-10}$ when the R/W-IC of the present invention based on the process for a line width of 0.25 $\mu$m was used. This was especially preferable. Incidentally, for the distance between the R/W-IC of the present invention and the head of the present invention, the data transfer rate could be increased to 50, 54, 54, 54 and 55 MB/S with decreasing distance to 3, 2, 1.5, 1 and 0.7 cm, respectively. Distances of not more than 2 cm were especially effective. It is needless to say that this effect does not depend on the diameter of a disk or forms of medium such as a disk, tape and card.

EXAMPLE 3

A third example of the present invention is described below by referring to FIGS. 5A and 5B, FIGS. 8A and 8B and FIGS. 3A and 3B.

Figure 5A:
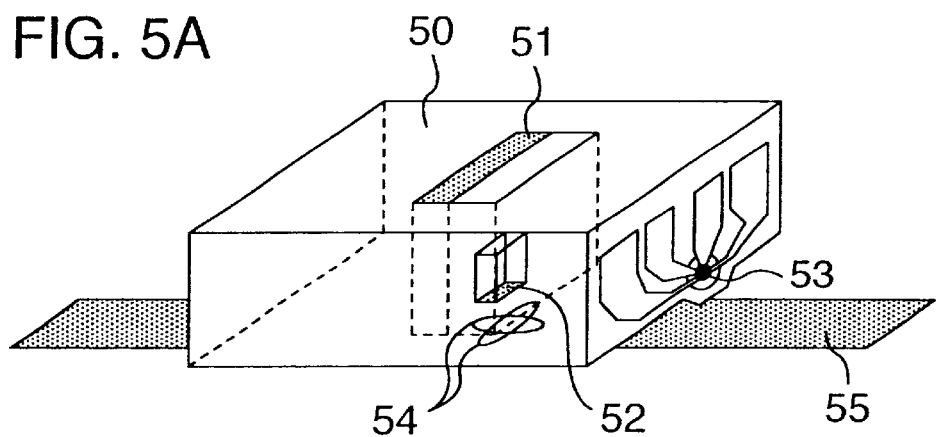
FIG. 5A shows schematically the essential portion of a magnetic head of the invention.
Figure 5B:
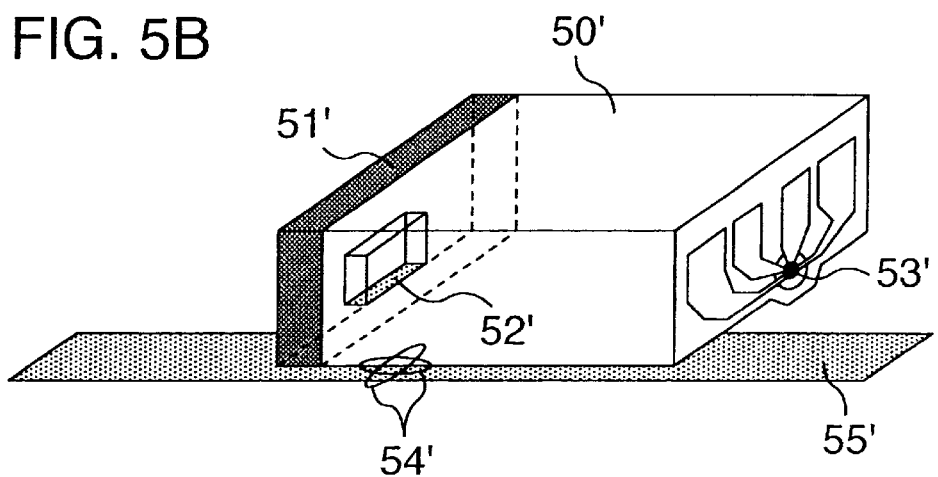
FIG. 5B shows schematically the essential portion of another magnetic head of the invention.

As shown in FIGS. 5A and 5B, a laser chip 52, 52' of about 0.3 mm square was mounted on a position-correcting mount 51, 51' of the piezoelectric force type, electromagnetic force type or magnetostrictive force type. The laser chip thus mounted on the position-correcting mount was then mounted on a head slider 50, 50' as shown in FIGS. 5A and 5B to permit adjustments so that a recording and reading element portion 53, 53' and a laser beam position 54, 54' are located almost on the same record track 55, 55'. An Al$_2$O$_3$-TiC slider of shaped rail structure with a size of 0.7×0.2 mm$^3$ (FIG. 5A), provided with three minute projections, was used and a 3-nm thick protective film of C-N was provided on the floating surface. The volume including the laser chip (FIG. 5B) was 1.0×0.9×0.2 mm$^3$, and the distance over which corrections are possible was 20 $\mu$m maximum. Although the correction mechanism is not always necessary, the absence of this mechanism was not much preferable because of a low margin for reproducibility. Incidentally, the laser wavelength was 830, 780, 650 and 630 nm and the power was from 5 to 50 mW. To prevent degradation, the end faces of the laser were provided with protective films. The shape of a laser beam was almost oval as indicated by 54, 54'. As shown in this figure, an examination was made as to two cases. In one case, the direction of the minor axis of about 1 μm was almost parallel to the record track 55, 55' and in the other case, the direction of the minor axis was perpendicular to the record track 55, 55'. The flying height was 10 nm.

Figure 6A:
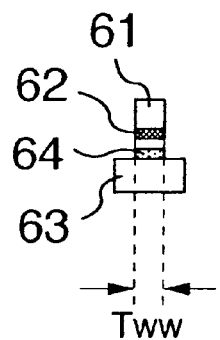
FIG. 6A shows schematically the essential portion of magnetic write head pole structure of the invention.
Figure 6B:
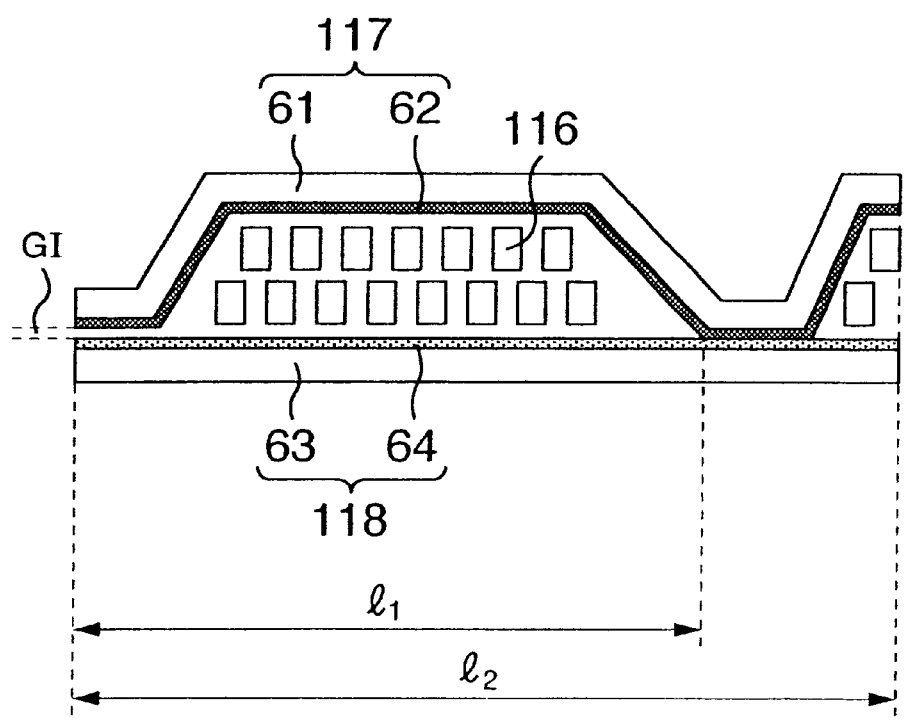
FIG. 6B shows a cross-sectional view of the magnetic head pole structure shown in FIG. 6A.

Incidentally, the recording element shown in FIGS. 6A and 6B, FIGS. 7A and 7B and FIGS. 8A and 8B was first used corresponding to the recording element 53, 53'. In the embodiment shown in FIGS. 6A and 6B, a 36Ni—62Fe—2Nb film with a resistivity of 75 μΩcm and a film thickness of 1.8 μm was formed as 62 and 64 and a 45Ni—55Fe film with a resistivity of 45 μΩcm and a film thickness of 1.8 μm was formed as 61 and 63. As shown in FIG. 6A, a track width $T_{ww}$ of 0.53 μm was obtained in the wafer state by performing trimming through the use of ion milling, the RIE method, etc. Furthermore, a magnetic core length $l_1$ of 35 μm, a magnetic pole length $l_2$ of 50, 55, 60 or 65 μm, a number of turns of Cu coil of 15, and a recording gap length Gl of 0.19 μm (material for the gap: $Al_2O_3$-5%$SiO_2$) were obtained.

Figure 7A:
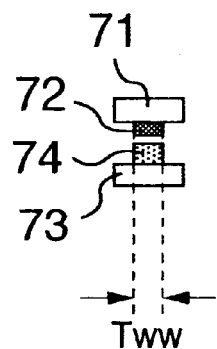
FIG. 7A shows schematically the essential portion of another magnetic write head pole structure of the invention.
Figure 7B:
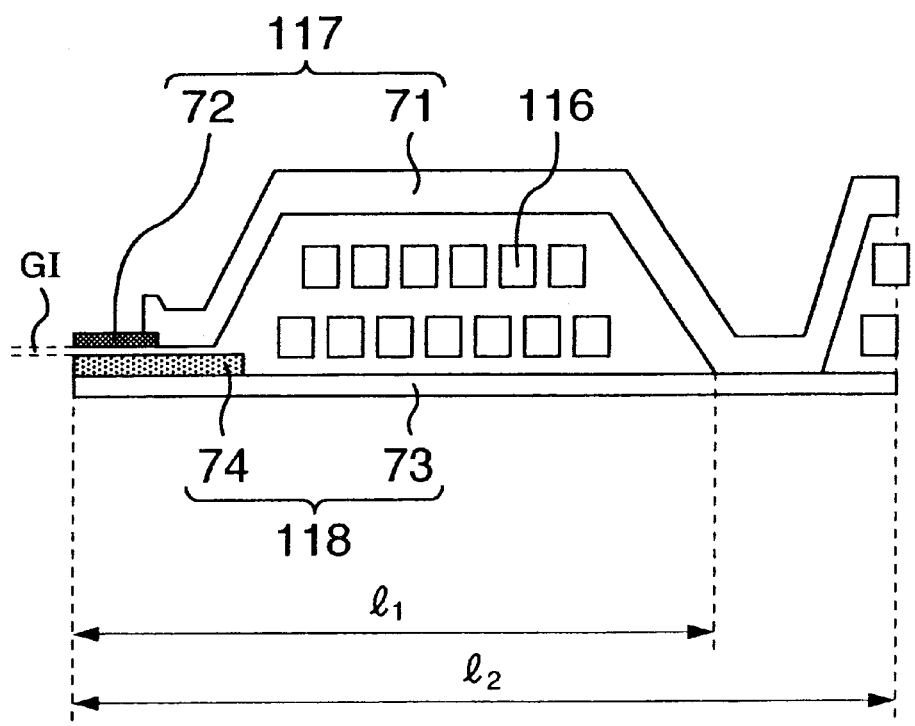
FIG. 7B shows a cross-sectional view of the magnetic write head pole structure shown in FIG. 7A.

In another embodiment shown in FIGS. 7A and 7B, an 80Co—10Ni—10Fe—1P film with a resistivity of 20 μΩcm and a film thickness of 0.7 μm was formed as 72 and 74 and a 75Co—10Ni—10Fe—5P film with a resistivity of 65 μΩcm and a film thickness of 1.5 μm was formed as 71 and 73. As shown in FIG. 7A, a track width $T_{ww}$ of 0.47 μm was obtained in the wafer state by performing fabrication and, furthermore, a magnetic core length 11 of 33 μm, a magnetic pole length $l_2$ of 45, 50, 55, 60 or 65 μm, a number of turns of Cu coil 116 of 15, and a record gap length Gl of 0.18 μm (material for the gap: $Al_2O_3$-5%$SiO_2$) were obtained.

Figure 8A:
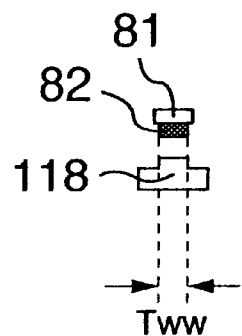
FIG. 8A shows schematically the essential portion of still another magnetic write head pole structure of the invention.
Figure 8B:
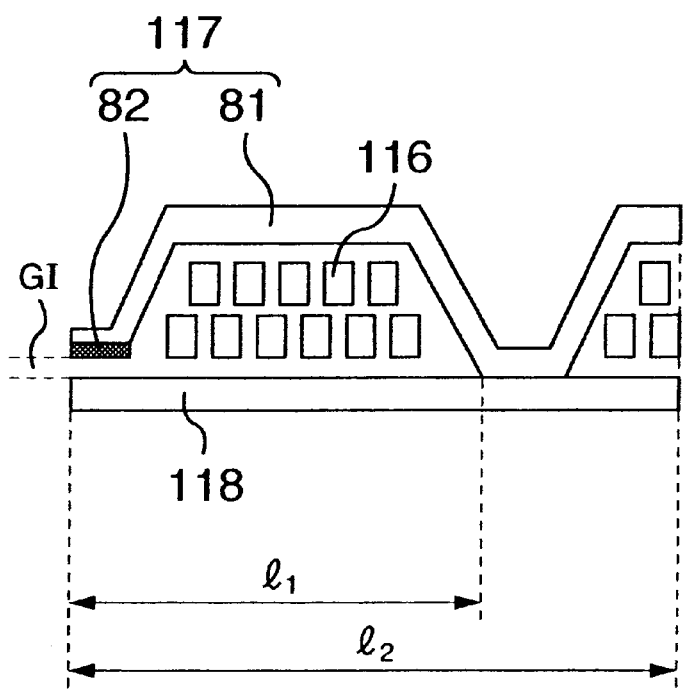
FIG. 8B shows a cross-sectional view of the magnetic write head pole structure shown in FIG. 8A.

In a further embodiment shown in FIGS. 8A and 8B, a multilayer film, obtained by alternately depositing an 90Fe—5Al—5Si film with a resistivity of 20 μΩcm and a film thickness of 0.1 μm and a 10-nm thick $ZrO_2$ layer to form a total of ten layers, was formed as 82 and a 75Co—15Ta—10Zr film with a resistivity of 100 μΩcm and a film thickness of 1.5 μm was formed as 118. As shown in FIG. 8A, a track width $T_{ww}$ of 0.5 μm was obtained in the wafer state by performing trimming by the FIB method and, furthermore, a 44Ni—56Fe film with a resistivity of 45 μΩcm and a film thickness of 1.9 μm was formed with an end width of 0.7 μm. The magnetic core length $l_1$ was 33 μm, the magnetic pole length $l_2$ was 40, 50, 55, 60 or 65 μm, the number of turns of Cu coil 116 was 11, and the record gap length Gl was 0.20 μm (material for the gap: $Al_2O_3$-7%$SiO_2$). Incidentally, still further embodiments with the same magnetic core length, but with different magnetic pole lengths of 55, 60 and 65 μm were also fabricated in addition to the above embodiments.

In all of these embodiments, the read element was fabricated as follows. A magnetically free NiFe/CoFe film (5 nm), a CuNi film (2.5 nm), a magnetically fixed layer of CoFe/Ru/CoFe film (5 nm) and an MnIr (13 nm) film were formed one after another and a rectangular pattern was obtained. After that, a permanent magnet of Co75—Ni15—Pt10—5%$HfO_2$ (12 nm) and an electrode film of Nb-Tl (90 mm) were arranged on both ends of the pattern and a giant magnetoresistive element with a track width of 0.41 μm, which is determined by the spacing between electrodes, was provided on a 2.1-μm thick plated shielding film of Ni80—Fe20 through the gap, thereby giving this structure to the read element (total shield gap: 0.8 μm, material for the gap: $Ta_2O_5$). The read portion thus fabricated was used as the magnetic head element of the present invention. In this example, an RW-IC fabricated by the scaledown process for 0.25 μm was mounted on the integrated circuit suspension that supports the above head. A signal processing LSI separately installed was of the EEPRM type formed by the scaledown processes for 0.25 and 0.2 μm.

The following media of the same structure as those shown in FIG. 1 were newly fabricated in addition to the media shown in Table 1. An amorphous magnetic material, which contains at least one metal element selected from the group consisting of Co, Fe and Ni as a primary component, at least two elements selected from a second group consisting of Cr, Mo, W, V, Nb, Ta, Ti, Zr, Hf, Pd, Pt, Rh, Ir and Si, and a least one element selected from a third group consisting of La, Ce, Pr, Nd, Pm, Sm, Eu, Gd, Tb, Dy, Ho, Er, Tm, Yb, Lu, Bi, Sb, Pb, Sn, Ge and B, was formed on a non-magnetic substrate of Si with a diameter of 3.5, 2.5, 1.8, 1 inch, etc. The numeral 14 indicates a protective film made of N-added C, H-added C, BN, ZrNbN, AlN, SiAlOH, etc. The numeral 15 indicates a lubricant of perfluoro-alkyl-polyether having adsorptive or reactive end groups such as OH and NH2, an organic fatty acid, etc. Between the non-magnetic underlayer 12 and the hard magnetic layer 13, there may be provided a second non-magnetic underlayer whose composition is further adjusted. When the above magnetic layer is divided by a non-magnetic intermediate layer, which contains as a main element at least one selected from the group consisting of Cr, Mo, V, Nb, Ta, Zr, Hf, Ti, Ge, Si, Co, Ni, Al, Zn, C and B singly or Cr—Ti10, Mo—Cr10, W—Si5, Ta—Si5, Nb—Zr10, Ta—Cr5, Zr—Hf10, Hf—Ti5, Ti—Si10, Ge—Pt5, Si—Ru11, Co—Cr30, C—N10, B—N10, etc., noise decreases almost in proportion to the square root of the total number of magnetic. Therefore, this is more preferable.

This example is explained below in further detail. A magnetic disk was fabricated by forming a non-magnetic underlayer of SiN, Cr alloy, etc. on an Si disk with a diameter of 1.8" and then further depositing one after another an amorphous magnetic layer of TbFeCo, DyFeCo, NdTbFeCo, TbFeCoNb, TbFeCoPt, etc., an 8-nm thick protective film of carbon to which 15% N is added, and a 5-nm thick lubricating film of perfluoro-alkyl-polyether having end groups of -OH.

Both the underlayer of SiN, Cr alloy, etc. and the magnetic layer were formed by means of an RF magnetron sputtering device using Ar gas and the protective film was further formed in an $N_2$ gas atmosphere by the plasma-induced reactive magnetron sputtering method. On that occasion, the Ar pressures was from 0.5 to 10 m Torr, the substrate temperatures was from 50 to 200° C., and the deposition rate was about 3 nm/s. In the underlayer, $Al_2O_3$ and Cr—Ti were used as a single layer or two layers composed of dissimilar underlayers in addition to SiN and Cr. Thus, samples of different underlayer compositions were prepared. The total film thickness of the underlayer was from 10 to 200 nm, that of the amorphous magnetic layer of TbFeCo, DyFeCo, NdTbFeCo, TbFeCoNb, TbFeCoPt, TbFeCoBi, etc. was from 20 to 750 nm, and that of the protective film was 8 nm. Compositions with a higher Fe concentration than usual compositions used in magneto-optic disks permit great saturation magnetization and allow the film thickness of a medium to be relatively reduced. Therefore, this was favorable in terms of magnetic recording. Magnetic disks of the present invention made by way of trial in Example 3 are shown in Table 2.

TABLE 2

| | Magnetic layer (nm) | Under layer (nm) | Ar sputtering pressure (mTorr) | Temperature of substrate (° C.) | Orientation of magnetic layer |
|---|---|---|---|---|---|
| 1 | $CoTb_{10}Zr_3Pt_{15}$ (200) | CrTi (40) | 0.2 | 200 | in-plane |
| 2 | $FeCo_{10}Tb_{15}Pt_5Cr_2$ (270) | CrTa (60) | 0.2 | 180 | perpendicular |
| 3 | $FeCo_5Tb_{20}Si_5Pd_2$ (350) | $Al_2O_3$ (100) | 0.5 | 150 | perpendicular |
| 4 | $FeCo_5Tb_7Bi_5Ta_2Cr_1$ (20) | CrV (30) | 0.5 | 100 | perpendicular |
| 5 | $FeCo_{10}Tb_{15}Nb_5Mo_2$ (270) | Cr (20) | 1.0 | 150 | perpendicular |
| 6 | $FeCo_{15}Dy_{15}Bi_5V_2Ti_2$ (450) | ZnS (30) | 1.0 | 200 | perpendicular |
| 7 | $FeCo_{10}Tb_{30}Ge_5Zr_2Ir_2$ (570) | Wti (10) | 2.0 | 50 | perpendicular |
| 8 | $FeCo_{10}Nd_{15}Pt_2W_2$ (370) | MoSi (20) | 2.0 | 200 | perpendicular |
| 9 | $FeCo_5Dy_{10}Lo_5Rh_2Hf_2$ (45) | NiCr (30) | 5.0 | 50 | perpendicular |
| 10 | $FeCo_{13}Tb_{26}Ce_5Pt_2Tr_2$ (350) | CoCr (20) | 5.0 | 100 | perpendicular |
| 11 | $FeCo_{10}Tb_{15}Pt_2Ta_2$ (270) | TaCr (30) | 0.2 | 150 | perpendicular |
| 12 | $FeCo_7Dy_{25}Nd_5$ (350) | MoCr (90) | 0.2 | 175 | perpendicular |
| 13 | $FeCo_{36}Tb_{16}Nd_{13}Pt_2V_3$ (650) | TaCr (65) | 0.5 | 150 | perpendicular |
| 14 | $FeCo_{42}Nd_{20}Pr_5Pt_2Ti_2$ (750) | V (40) | 0.5 | 181 | perpendicular |
| 15 | $FeCo_{16}Tb_{26}Eu_5Pt_4Pd_2$ (750) | Nb (40) | 1.0 | 124 | perpendicular |
| 16 | $FeCo_{13}Tb_{23}Nb_1W_2$ (650) | TiCr (50) | 1.0 | 54 | perpendicular |
| 17 | $FeCo_{10}Tb_{20}Pm_3Si_2W_2$ (590) | WCr (50) | 2.0 | 165 | perpendicular |
| 18 | $FeCo_{15}Dy_{15}Gd_5Ir_2W_2$ (580) | TiTa (60) | 2.0 | 65 | perpendicular |
| 19 | $FeCo_{15}Tb_{22}Rh_2Zr_2$ (570) | TiV (50) | 5.0 | 145 | perpendicular |
| 20 | $FeCo_{10}Nd_{15}Pd_2Si_2$ (690) | TiPt (50) | 5.0 | 116 | perpendicular |
| 21 | $FeCo_{12}Tb_{28}Iio_5Ir_2Ti_2$ (680) | TiPd (50) | 10 | 195 | perpendicular |
| 22 | $FeCo_{10}Tb_{22}Er_5Zr_2V_2$ (530) | TiNb (60) | 10 | 121 | perpendicular |
| 23 | $FeCo_{10}Tb_{22}Tm_5Nb_2Mo_2$ (570) | SiN (60) | 10 | 101 | perpendicular |
| 24 | $FeCo_{10}Tb_{22}Yb_5Cr_2W_2$ (480) | C (50) | 1.0 | 95 | perpendicular |
| 25 | $FeCo_{10}Tb_{22}Lu_5$ (500) | Ge (50) | 1.0 | 81 | perpendicular |

In all of the media of this example, the magnetic films are made of amorphous materials with an in-plane or a perpendicular anisotropy. Especially, in perpendicular media, the noise coefficient is generally negative. In media with a coercive squareness of not less than 0.95, noise was especially low and this was preferable. In all cases, the absolute value of normalized noise coefficient per recording density was not more than $25 \times 10^{-8}$ $(\mu Vrms)(inch)(\mu m)^{0.5}/(\mu Vpp)$. Under the same conditions as with the above third example in Table 2, media of another embodiment were fabricated by dividing the magnetic layer into two layers by a non-magnetic intermediate layer, which is made of Cr, Mo, W, V, Nb, Ta, Zr, Hf, Ti, Ge, Si, Co, Ni, C or B singly or Cr—Ti10, Mo—Cr10, W—Si5, Ta—Si5, Nb—Zr10, Ta—Cr5, Zr—Hf10, Hf—Ti5, Ti—Si10, Ge—Pt5, Si—Ru11, Co—Cr30, C—N10, B—N10, S—N50, etc. In all these media, noise decreased to the levels of from 65 to 75%. This was especially preferable.

To fabricate a magnetic disk device, 10 media shown in Table 1 or Table 2 were mounted as 31 and 20 heads of each of the above embodiments were mounted as shown in FIGS. 3A and 3B. Recording was performed by magnetic fields from the magnetic heads while controlling the coercive force of media by the local heating effected by means of a laser during information recording. The number of revolutions was from 20,000 to 30,000 rpm and temperature rises in the recording positions of media by local heating were optimally controlled in the range of about 50° C. to 300° C. Under this method, recording conditions are susceptible to fluctuations in external temperature. Therefore, it was desired to optimize laser power by performing trial writing in the initial stage of recording and at prescribed intervals of time after operation.

In all the media, when the major axis of laser almost coincided with the track direction, interference with adjoining tracks was small and the best characteristics were obtained. Even in a case where the minor axis coincided with the track direction, however, high densities about twice the density in conventional technology could be realized. More specifically, areal densities of not less than 7 $Gb/in^2$ could be achieved at 50 MB/s for the media of the embodiments shown in Table 1 and areal densities of not less than 15 $Gb/in^2$ could be achieved at 50 MB/s similarly for the media of the embodiments shown in Table 2. In a device provided with the above media having a magnetic layer divided into two layers, recording density could be improved by about 20%. This was especially preferable. Incidentally, a read signal processing LSI fabricated by the process for 0.2 $\mu$m was about 30% favorable in terms of power consumption and processing speed.

EXAMPLE 4

The heads of Example 3 were also adopted as the magnetic heads of Example 1 and Example 2 and evaluated. In all of these heads of Example 3, operation of the device at areal densities of not less than 7 $Gb/in^2$ and data transfer rates of not less than 60 MB/s were verified and characteristics equal to or better than those obtained in Example 1 and Example 2 were obtained. This was especially preferable in terms of data transfer rate. When the magnetic pole length was 55, 60, and 65 $\mu$m, recording and reading were possible at a data transfer rate of from 60 to 65 MB/s. However, when the magnetic pole length was not more than 50 $\mu$m, data transfer rate of from 66 to 70 MB/s was possible. This was especially preferable. It was ascertained by a computer simulation that it is important to reduce not only the magnetic core length l, but also the magnetic pole length $l_2$ because eddy currents are generated in the rear part of a magnetic pole. The R/W-IC portion was separated from the signal processing portion and formed by the scaledown process for not less than 0.35 $\mu$m. After that, this R/W-IC portion was mounted on the integrated circuit suspension of the present invention in which thin-film lead layer and an insulating layer are formed directly on a plate spring by the thin film process, or on a wiring FPC, and the distance from the head was set at not more than 1 cm. In this case, degradation of signals was not practically observed and an improvement in data transfer rate of not less than 50 MB/s was observed compared to a case in which an R/W-IC was integrated with a signal processing circuit and installed on a circuit board as conventionally. This was especially preferable.

The above Examples 1 to 4 represent typical inventions disclosed in the present invention and examples that can be easily analogized by those skilled in the art also included in the scope of the present invention. Similar effects are obtained from the RF magnetron sputtering method, ECR sputtering method and helicon sputtering method, for example. Furthermore, similar effects are obtained form the oblique-evaporation method in an oxygen atmosphere and the ionized cluster beam method and also by changing the incidence position corresponding to each radius of a disk. It is needless to say that similar effects are obtained by installing a Peltier-effect element in the head and performing heating. Furthermore, the magnetic recording medium, head and device disclosed in this invention enable magnetic recording and reading in high data transfer rate at not less than 50 MB/s to be performed at a recording density of not less than 5 Gb/in$^2$. Therefore, high data transfer rate and large-capacity magnetic recording and reading devices in which magnetic tapes, magnetic cards, magneto-optic disks, etc., are used as the magnetic recording media of the present invention, are also included in the scope of the present invention.

As mentioned above, the use of the magnetic recording medium and magnetic recording and reading device of the present invention, for the first time, enables high data transfer rate and large-capacity recording and reading to be performed. As a result, magnetic recording and reading devices with very strong product competitiveness can be realized.

What is claimed is:

1. A magnetic recording and reading device having a transfer rate which is not less than 50 MB/s and which comprises:

a magnetic recording medium having an absolute value of normalized noise coefficient per recording density of not more than $2.5 \times 10^{-8}$ $(\mu Vrms)(inch)(\mu m)^{0.5}/(\mu Vpp)$;

a magnetic head which is mounted on an integrated circuit suspension so that a total inductance is reduced to be not more than 65 nH and having a magnetic core which is not more than 35 $\mu$m of length, a part of the magnetic core being formed by a magnetic film having a resistivity exceeding at least 50 $\mu\Omega$cm or by a multilayer film consisting of a magnetic film and an insulating film; and a fast R/W-IC having a line width of not more than 0.35 $\mu$m;

wherein said magnetic head is provided with a reading element comprising one of a giant magnetoresistance effect element and a thin film having tunneling-magnetoresistance effect, with an effective track width of not more than 0.9 $\mu$m, and performs reading of magnetic information at an areal density of not less than 5 Gb/in$^2$; and wherein said magnetic recording medium has a magnetic layer which comprises at least one metal element selected from the group consisting of Co, Fe and Ni as a primary component, at least two elements selected from a second group consisting of Cr, Mo, W, V, Nb, Ta, Ti, Zr, Hf, Pd, Pt, Rh, Ir and Si, and at least one element selected from a third group consisting La, Ce, Pr, Nd, Pm, Sm, Eu, Gd, Tb, Dy, Ho, Er, Tm, Yb, Lu, Bi, Sb, Pb, Sn, Ge and B.

2. A magnetic recording and reading device according to claim 1, wherein said magnetic layer of said magnetic recording medium is an amorphous material.

3. A magnetic recording and reading device according to claim 1, wherein said magnetic layer of magnetic recording medium is multilayered composed of a magnetic thin film and a non-magnetic intermediate layer comprising at least one kind of element selected from the group consisting of Cr, Mo, W, V, Nb, Zr, Hf, Ti, Ge, Si, Co, Ni, C and B as a primary component.

* * * * *